US005353148A

United States Patent [19]
Eid et al.

[11] Patent Number: 5,353,148
[45] Date of Patent: Oct. 4, 1994

[54] ELECTROCHROMIC DEVICE

[75] Inventors: Bernard A. G. Eid, Champagne-Seine; Jean-Pierre Themont, Montigny/Loing, both of France

[73] Assignee: Corning Incorporated, Corning, N.Y.

[21] Appl. No.: 933,248

[22] Filed: Aug. 21, 1992

[30] Foreign Application Priority Data
Sep. 16, 1991 [FR] France ................. 91 11374

[51] Int. Cl.$^5$ .............................................. G02F 1/15
[52] U.S. Cl. .................................. 359/265; 359/266
[58] Field of Search ............. 359/265, 266, 271, 275

[56] References Cited

U.S. PATENT DOCUMENTS

| | | | |
|---|---|---|---|
| 4,786,128 | 11/1988 | Birnbach | 385/8 |
| 5,128,799 | 7/1992 | Byker | 359/265 |
| 5,231,531 | 7/1993 | Defendini et al. | 359/265 |
| 5,282,077 | 1/1994 | Byker | 359/265 |

FOREIGN PATENT DOCUMENTS 408427 11/1989 European Pat. Off. .

Primary Examiner—John T. Kwon
Attorney, Agent, or Firm—C. S. Janes, Jr.

[57] ABSTRACT

This invention relates to an electrochromic device comprising a layer (2') of an electrochromic product held between two conducting layers (5',6') each formed on one face of a transparent plate (3',4'), electrodes formed on each of the conducting layers, and a source of direct current for selectively supplying these electrodes with electrical energy. Electrodes (8', 9', 10, 11) are of elongated shape and extend over facing surfaces of the two conducting layers (5',6'), essentially symmetrical with respect to the plane of the electrochromic layer (2').

The invention has application to windows in the building industry or the automobile industry (windshields, windows, rear view mirrors, etc.)

6 Claims, 2 Drawing Sheets

ELECTROCHROMIC DEVICE

BACKGROUND OF THE INVENTION

The present invention is related to an electrochromic device and, more particularly, to such a device conceived for modulating light transmitted or reflected by equipment items or apparati such as windows, display cases, windows or rear view mirrors for automobiles, electrooptic shutters, display screens, or others.

Electrochromic devices consisting of a liquid or solid layer of an electrolytic material confined between two transparent electrodes are known which, as the result of the application of a voltage between the two electrodes, take on a coloration due to the formation of a metallic layer on one of the electrodes or to the insertion of ions into an oxide layer. Thus, by varying electrically the optical density of the device, it is possible to modulate the transparency or the reflectance of the equipment items mentioned above for adaptation to variations in the ambient lighting, for example.

In particular, from French Patent Application No. 91 00223, filed Jan. 10, 1991 by the applicants of the present application, an electrochromic electrolytic material is known consisting of a homogeneous solution of at least one organic solvent and of at least one salt of an electrodepositable metal, the solution comprising, in addition, at least one organic acid and at least one salt of a non-electrodepositable metal facilitating the dissolution of the electrodepositable metal salt. As an example, this material can then be constituted from bismuth bromide in solution in gamma-butyrolactone, and comprises, in addition, lithium bromide to facilitate the solubilization of bismuth bromide. Such a material exhibits an improved thermal stability and permits the formation of absorbing and/or reflecting metal deposits in electrochromic devices for modulating light of large size and simple structure.

Such a device generally exhibits the structure represented partially in perspective in FIG. 1 of the appended drawing. This figure illustrates that the device takes the form of cell 1 comprising a layer of electrochromic material 2 confined between two plates 3, 4 in a transparent material such as glass, which plates carry on their two opposing faces conducting layers 5, 6, respectively. A joint 7 of an adhesive material, for example, laterally confines electrochromic layer 2, assuring the assemblage of plates 3, 4 with maintenance of a predetermined space (several tens of $\mu m$) between them. Conventionally also, the application of an electrical voltage to the two conducting layers 3, 4 is assured by elongated and parallel electrodes 8, 9, respectively, disposed on the conducting layers 5, 6, respectively, along two opposite edges of the cell. Electrodes 8, 9 are prepared from a material of much higher conductivity than that of conducting layers 5, 6 generally comprised of the oxide of tin and/or indium (ITO) and prepared by deposition under vacuum. Electrodes 8, 9 thus improve the uniformity of the distribution of an electrical voltage input delivered from a source (not shown) upon the entire layer of electrochromic material.

One first difficulty that one encounters in the use of electrochromic cells resides in the necessity to assure a rapid darkening of the cell, capable of following the fluctuations of the ambient light, brutal and glaring when, for example, the headlights of a vehicle strike to flash the reflecting surfaces of a rear view mirror equipped with such a cell. There currently exists a need for electrochromic devices having, from this point of view, a very short response time, less than that possible to obtain in the cell with two electrodes disposed as shown in FIG. 1.

Among the other difficulties encountered in assuring good operation of a cell of the type shown in FIG. 1, one encounters those derived from the existence of parasitic electric currents flowing transversely through the cell from one electrode to the other in parallel to the different layers constituting this cell. One ascertains experimentally the existence of these currents which are added to the current perpendicular to the conducting layers which are necessary for the generation of the electrochromic effect. The parasitic currents cause the migration of ions from one side of a cell to the other, when one uses the input configuration with two electrodes shown in FIG. 1. Although these parasitic currents have hardly any immediate visible effects, they cause over a long time, through a cumulative effect, an asymmetry of coloration of the cell with applied voltage; coloration which is then stronger in the vicinity of one of the electrodes whereas one seeks, on the contrary, a uniformity as good as possible of this coloration.

Another difficulty involves the deterioration over time of one of the conducting layers 5, 6, the one on which a metallic deposit is brought about which assures the coloration of the cell. Indeed, physiochemical effects resulting from such deposits on the conducting layer cause a diminution of its conductivity. This diminution affects only one of the two conducting layers; the distribution of current in one cell with two electrodes of the type shown in FIG. 1 is affected in an asymmetric manner, which reinforces again the harmful effects of the parasitic currents mentioned above in the matter of losses of uniformity of the coloration of the cell under voltage.

One observes again in the cells with two electrodes of the same type a much weaker coloration in the center of the cell than that which one observes in the vicinity of the electrodes; this phenomenon being much more pronounced as the distance separating electrodes 8, 9, and therefore the width of the cell, increases.

Besides the problems of non-uniformity of coloration mentioned above, the current technology of electrochromic cells makes apparent various other needs which are not yet perfectly satisfied. The operation of such a cell requires the consumption of a certain electrical power. It appears desirable to conceive cell structures permitting reduction thereof to a minimum. In another connection, many current or potential applications of electrochromic devices concern automobile vehicles. There exists a need for such devices incorporating the possibility of electrical heating permitting a time of defrosting transparent plates 3, 4 and a reheating of the electrochromic layer to an adequate operating temperature. In this regard, it is clear that the cell with two electrodes of FIG. 1 does not permit passing a current from one side of one of the conducting layers 5, 6 to the other to heat it by the Joule effect. Document EP-A-0408427 describes an electrochromic pane comprising a third electrode enabling such heating, but only one of the two conducting layers.

The present invention therefore has a purpose of preparing an electrochromic device with a short darkening time and a coloration under voltage of improved uniformity.

The present invention also has a purpose of preparing such a device with reduced power consumption to obtain the electrochromic effect.

The present invention also has a purpose of preparing such a device incorporating means of heating of improved efficacy.

SUMMARY OF THE INVENTION

One achieves the purposes of the invention, as well as others which will become apparent upon reading the following description, with an electrochromic device comprising one layer of an electrochromic product held between two conducting layers formed on each face of a transparent plate, electrodes formed on each of the conducting layers, and means for selectively supplying these electrodes with electrical energy. According to the invention, the electrodes are of elongated shape and extend over facing surfaces of two conducting layers essentially symmetrically with respect to the plane of the electrochromic layer.

Thanks to this configuration of electrodes, the circulation of current in the electrochromic layer is symmetrical and the intensity thereof reinforced for a given voltage input. As a result, the time of darkening of the layer is shorter and the uniformity of this darkening improved over the entire surface of this layer by the suppression of transverse parasitic currents mentioned above. This symmetrization also permits, as will be seen later, a reduction of non-uniformities of coloration of the layer which would otherwise result, in the long term, from the degradation of the conducting layers.

According to one embodiment of the present invention, the electrochromic layer is limited by at least two essentially straight long edges bounded by at least four electrodes disposed face to face parallel and in proximity to each of the two edges.

Advantageously, the distance $l$ between these sides of the electrochromic layer is such that $l < 0.5.l_c$ and preferably $l < 0.3.l_c$, $l_c$ being a critical width which will be defined in the rest of the present description. According to another characteristic of the device, according to the invention, one of the two parallel electrodes carried by the same conducting layer is selectively connected to a source of electric power in order to heat the device by the Joule effect developed in the conducting layer between the two electrodes. One utilizes for this purpose a source of alternating current which is superimposed on a common supply to the two electrodes for a direct current. One also advantageously assures the possible heating and defrosting of the device.

The electrochromic device according to the invention can also comprise a plurality of pairs of facing electrodes defining together an essentially closed contour of only two electrodes, to develop accordingly an essentially closed contour, rectangular or annular, for example. Such configurations of electrodes permit the improvement also of the uniformity of the coloration of the electrochromic device according to the invention when the latter is placed under voltage.

Other characteristics and advantages of the present invention will become apparent upon reading the description which follows and examining the appended drawings.

GENERAL DESCRIPTION OF THE INVENTION

Figure 1:
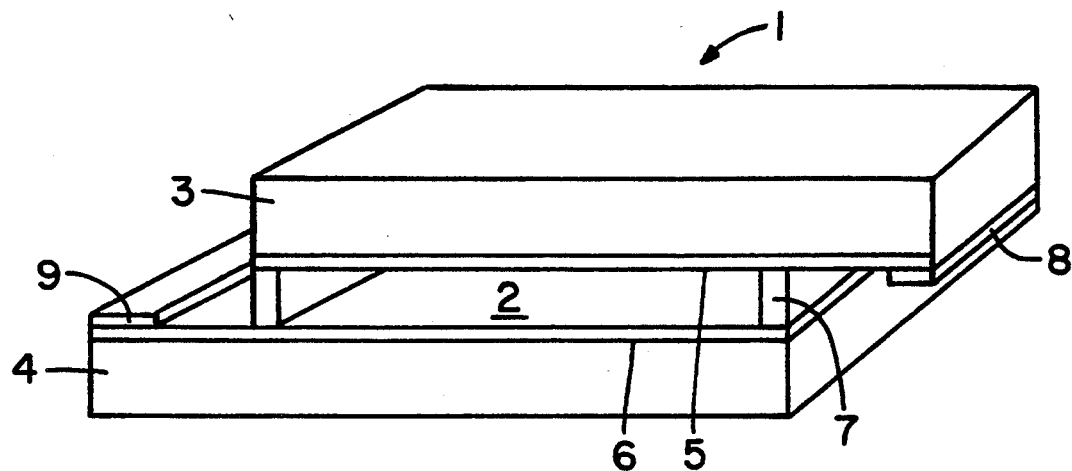
FIG. 1 is a partial perspective view of an electrochromic cell of the prior art, discussed in the Background of the Invention.
Figure 2:
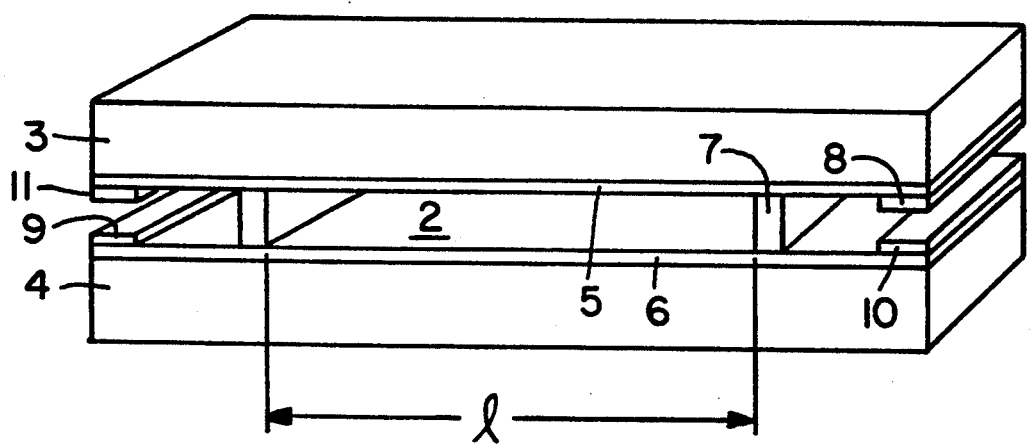
FIG. 2 is a partial perspective view of an electrochromic device according to the present invention.

Reference is made to FIG. 2 of the drawings wherein the identical numerical references to the cells are utilized as in FIG. 1, except with superscript primes, repeating identical or similar elements or devices. Thus, the electrochromic element according to the invention represented in FIG. 2 takes on, like the one of FIG. 1, the form of a cell in the heart of which one finds a layer of an electrochromic product 2 confined between two transparent plates 3', 4' covered on their facing sides with conducting layers 5', 6', respectively. An adhesive joint 7' laterally confines the layer 2' between plates 3', 4' whereby the assemblage is assured besides.

The electrochromic layer 2' can be comprised of any material susceptible to be colored under the effect of the application of an electrical voltage and, in particular, by the electrolytic material described in French Patent Application No. 91 00223 cited above. The conducting layers 5', 6' may be comprised conventionally of the oxide of tin and/or indium (ITO) or of fluorine (FTO) formed by well known techniques of deposition under a vacuum, such as cathodic sputtering (ITO), vapor phase deposition (FTO), or pyrolysis.

According to an essential characteristic of the cell according to the invention, the latter no longer comprises two electrodes disposed asymmetrically with respect to the plane of electrochromic layer 2', as in the cell of FIGS. 1, but four electrodes are disposed symmetrically with respect to the plane of this layer and are divided in two pairs 8', 10 and 9', 11 parallel and in the vicinity of two opposite edges of layer 2'. The electrodes of the same pair are essentially straight and disposed facing one another. Electrodes 8', 11 on the one hand and 9', 10 on the other hand are thus formed on facing surfaces of conducting layers 5', 6'. A source of direct current (not shown) may be connected selectively by a terminal to electrodes 8', 11 and by another terminal to electrodes 9', 10. The points of connection of these terminals and of these electrodes can be established on extensions (not shown) of electrodes, not positioned facing the other electrode of the same pair, in order to facilitate access to these points of connection. By appropriate choice of the sign and amplitude of the voltage thus established in layer 2', one can either cause a coloration of the layer to appear (darkening) or to cause this coloration to disappear (fading).

The disposition of electrodes 8', 9', 10, 11 according to the invention assures a perfect symmetry of the lines of current in the electrochromic layer, those lines traversing the latter perpendicularly to its plane, which avoids any generation of transverse parasitic currents capable of creating inhomogeneities of coloration of the layer in the darkening phase, as noted in the Background of the Invention.

Furthermore, a reinforcement of the current in the cell, for a given voltage supply, with respect to that observed in a cell of two electrodes of the type shown in FIG. 1 has been established experimentally. This reinforcement is favorable for reducing the darkening time of the cell for a given voltage, as the display of measurements brings together in the following table:

| Type of formulation | Resistivity of layers (5″, 6′) | Darkening time at λ = 663 nm | |
|---|---|---|---|
| | | Cell of FIG. 2 | Cell of FIG. 1 |
| Rear view mirror | 10 Ω/square | 1.4 s | 2.4 s |
| rear view mirror | 4 Ω/square | 1.3 s | 1.5 s |
| Large surface | 4 Ω/square | 11.9 s | 17.4 s |

This table brings together measurements made with an experimental cell with a surface of 2.5×4 cm² the distance between electrodes 8′, 10 on the one hand and 9′,11 on the other hand being slightly greater than 4 cm. For the electrochromic layer, two different formulations of electrolytic material described in French Patent No. 91 00223 cited above were used. One of the formulations is suitable for equipment items of small surface, such as automobile rear view mirrors, while the other formulation suits equipment items of large surface such as windows.

A clear reduction of darkening time with the two formulations is ascertained from this table.

The reinforcement of the current in the cell, for a given supply of direct current, which has been mentioned above, permits, in the other direction, the use of sources of lower voltage in order to obtain the same current. In this manner one obtains cell currents essentially equal by using a source of voltage of 1.8 volts with a cell of the type of FIG. 1 and a source of voltage of 1.5 volts with a cell according to the invention.

A modeling of the cell according to this invention has confirmed the symmetry of the current in the cell and the suppression of transverse currents. This modeling equally permits an explanation of another advantage provided by the invention; that is, the reduction of the inhomogeneity of the coloration of the cell resulting from a degradation over the long term of one of the conducting layers by a metal deposit which takes place at the level of this layer, as was noted in the Background of the Invention. If, therefore, the resistance of the surfaces of the two conducting layers take on, over the long term, different values $R_s$ at $R'_s$, the model shows that the distribution of current in the cell takes place as if these layers presented uniformly a surface resistance equal to $(R_s+R'_s)/2$. This behavior suppresses or reduces the asymmetry, over the long term, of the optical density of the electrochromic layer.

The same modeling has permitted establishing one condition for obtaining a coloration of homogeneous density over all of the surface of the cell without decreasing this density in the center of the cell and this continually.

Indeed, according to the invention, the critical width $1_c$ is defined such that:

$$1_c = \frac{(2.Z.S.)^{\frac{1}{2}}}{(R_s)}$$

where Z is the real impedance of the electrochromic layer;

S its surface; and $R_s$ the surface resistance of the conducting layers in ohms/square.

The model and the measurements have permitted establishing that one obtains a density of cell coloration truly uniform over the entire surface thereof if the width l of the electrochromic layer (see FIG. 2) is such that:

$$1 < 0.5.1_c$$

where, preferably:

$$1 < 0.3.1_c$$

The dispositions of the electrodes other than those illustrated in FIG. 2 are used in order to best satisfy this condition of width. Thus, one can arrange more than two pairs of rectilinear electrodes over the periphery of the electrochromic layer; for example, four pairs around one rectangular layer thereby essentially surrounded on its four sides by electrodes. One could dispose an even greater number of rectilinear electrodes over an essentially closed periphery surrounding an electrochromic layer in applications where the form of this layer must deviate from a rectangular shape: rear view mirrors, eyeglasses, etc.

Figure 3:
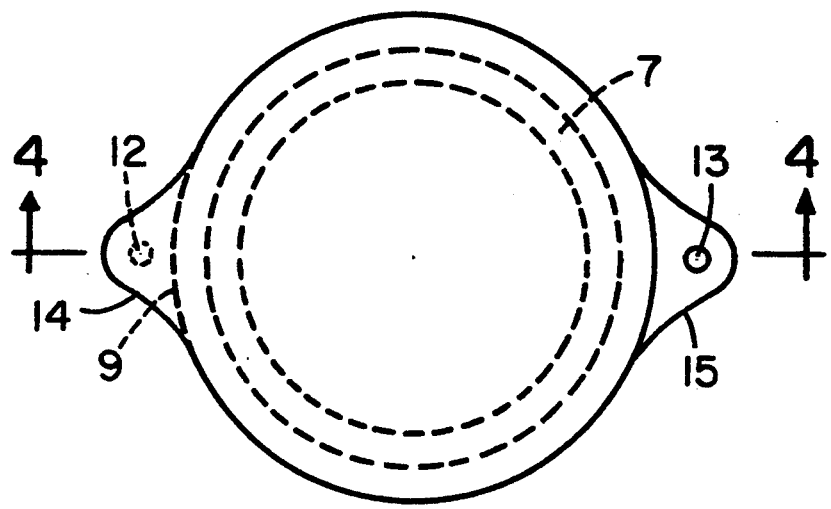
FIG. 3 is a plan view of an annular electrochromic device according to the present invention.
Figure 4:
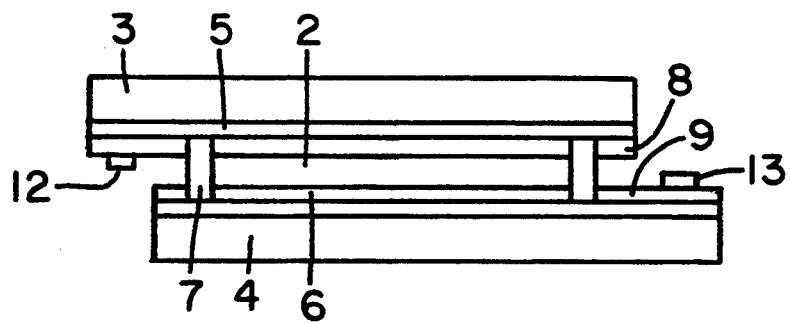
FIG. 4 is a view in cross section according to the line of section III—III of the device of FIG. 3.

According to the invention, one can also prepare a cell comprising only two electrodes extending over facing surfaces outlining a closed or essentially closed periphery, rectangular, annular, or other. In this manner is shown in FIGS. 3 and 4, where references identical to those in FIG. 2 are used to mark identical or similar devices, a cell comprising two essentially circular electrodes 8′, 9′. The supply of electricity to the two electrodes takes place through contacts formed on lugs 14, 15 much of which provides access to one of the electrodes. The modeling mentioned above confirmed that the geometry of the electrodes makes the lines of current in the electrochromic layer perpendicular. The homogeneity of the coloration of the cell can be reinforced through an appropriate choice of the diameter of the electrochromic layer, the diameter being assimilated to a "width" respecting the critical width defined above.

If the configuration of the two electrodes of the cell of FIGS. 3 and 4 does not lend itself to the addition of heating of the cell, the configuration with four electrodes of the cell of FIG. 2, and all configurations which flow therefrom, advantageously allow such heating by the Joule effect developed in conducting layers 5′ and 6′. The supply of electricity required can even be regulated, according to the invention, in a manner so as not to upset the electrochromic effect, if the latter is produced during heating of the cell.

For this purpose it is proposed, according to the invention, to supply electrodes 8′, 9′, 10, 11 with voltages $V_8$, $V_9$, $V_{10}$, $V_{11}$ such that:

$$V_{8'}=V_{c1}; \quad V_{4'}=V_{c1}+V_{c2} \sin \omega t$$

$$V_{10}=V_{c2} \quad V_{9'}=V_{c2} \sin \omega t$$

with:

$V_{c2}-V_{c1}=$voltage required to obtain the electrochromic effect.

Voltages $(V_{11}-V_{8'})$ and $(V_{10}-V_{9'})$ permit the development of heating by Joule effect of layers 5′ and 6′, respectively; the frequency $w/2\pi$ of the alternating component $V_{c2} \sin \omega t$ being chosen sufficiently high (typically >50 Hz) in order to not cause a parasitic modulation of the optical density of the electrochromic layer. One notes that through this choice of the supply of voltages to the electrodes, differences in voltages ($V_{8'} - V_{10}$) and ($V_{9'} - V_{11}$) of facing electrodes remain equal. Heating at that time does not upset the electrochromic effect at all. Such heating is particularly useful when a window or a rear view mirror has to be defrosted, as is the case in an automobile. It permits at the same time bringing the electrochromic layer to an appropriate operating temperature.

The manufacture of an electrochromic cell according to the invention calls for known techniques. The assemblage of transparent plates 3' and 4' can be produced by pouring onto one of the plates around electrochromic layer 2', if the latter is solid, a ribbon of an adhesive product. If the electrochromic product is liquid, the ribbon of adhesive is deposited first, plates 3', 4' are assembled with the aid of this ribbon and liquid electrochromic product is introduced into the enclosure thus formed by aspiration, for example. The adhesive ribbon constitutes, at the same time, after hardening, joint 7' laterally confining the electrochromic product. Numerous adhesive products are available for this use, such as epoxy or acrylic resins, polyurethane or silicone glues, thermoplastic glues (ethylene/vinyl acetate, polyamide), etc. One can arrange two parallel adhesive ribbons in order to improve the tightness of the cell. The adhesive product chosen must assure good protection of the electrochromic product against humidity and oxidation while assuring a good mechanical and thermal strength of the assembly.

In like manner, the electrodes can be formed on the conducting layers through various known techniques such as serigraphy or the deposition of a ribbon of an epoxy glue doped with silver, such as the glues sold under the names Epotek H21D, H22, H24 by the Epotekny Company or a conducting paste with platinum or gold, with palladium and with silver or with silver alone, such as the pastes sold under the references 9710, 9110, 7115 by the Degussa Company, for example, with the aid of a robot-commanded syringe; the deposition being followed by a thermal treatment, as is well known. One seeks to obtain low resistivity electrodes.

It now appears that the electrochromic device according to the invention does indeed produce the promised advantages; that is, a decreased time of darkening phase, a maintenance of this homogeneity in case of degradation over time of a conducting layer, a reduced voltage consumption, and a possibility of heating and defrosting the device.

It will be well understood that the invention is not limited to the described and presented embodiments which are given only as examples. Therefore, the invention extends to electrochromic cells provided with an electrolyte with ionic or protonic conduction, for example; such cells also having the advantage of symmetry of current of the cell obtained by the present invention.

We claim:

1. An electrochromic device comprising an electrochromic layer (2') held between two conducting layers (5',6') and being bounded by at least two essentially straight edges, at least four electrodes (8',9',10,11) of elongated shape extending over facing surfaces of said two conducting layers (5',6') with means for selectively supplying these electrodes with electrical energy, said electrodes being disposed facing two-by-two in parallel in the vicinity of each of the straight edges and being essentially symmetrical with respect to the plane of said electrochromic layer (2'), the distance between said edges of said electrochromic layer (2') being such that $1 < 0.5 l_c$ and, preferably $1 < 0.3 l_c$ where ($l_c$) is a critical width defined by the equation $$l_c = \frac{(2.Z.S.)^{\frac{1}{2}}}{(R_s)}$$

where Z is the real impedance of electrochromic layer (2');
S is the surface of electrochromic layer (2'); and
$R_S$ is the resistance of the surface of conducting layers (5'6') in ohms/square.

2. A device according to claim 1 characterized in that the facing electrodes of a pair of such electrodes are selectively connectable to a source of direct current of identical magnitude for all the pairs of electrodes.

3. A device according to claim 1 characterized in that one of the two parallel electrodes carried by the same conducting layer is selectively connectable to a source of electrical energy appropriate for heating the device by Joule effect developed in the conducting layer between the two electrodes.

4. A device according to claim 3 characterized in that said source is a source of alternating current which is superimposed on a supply common to the two electrodes by a direct current.

5. A device according to claim 4 characterized in that the frequency of the source of alternating current is higher than a predetermined frequency chosen in order not to induce any electrochromic effect in the electrochromic layer.

6. A device according to claim 5 characterized in that the electrode situated facing the one which is supplied by a source of alternating current is simultaneously supplied by the same source.

* * * * *